J. M. ENYART.
CRATE.
APPLICATION FILED JUNE 29, 1908
908,983.
Patented Jan. 5, 1909.
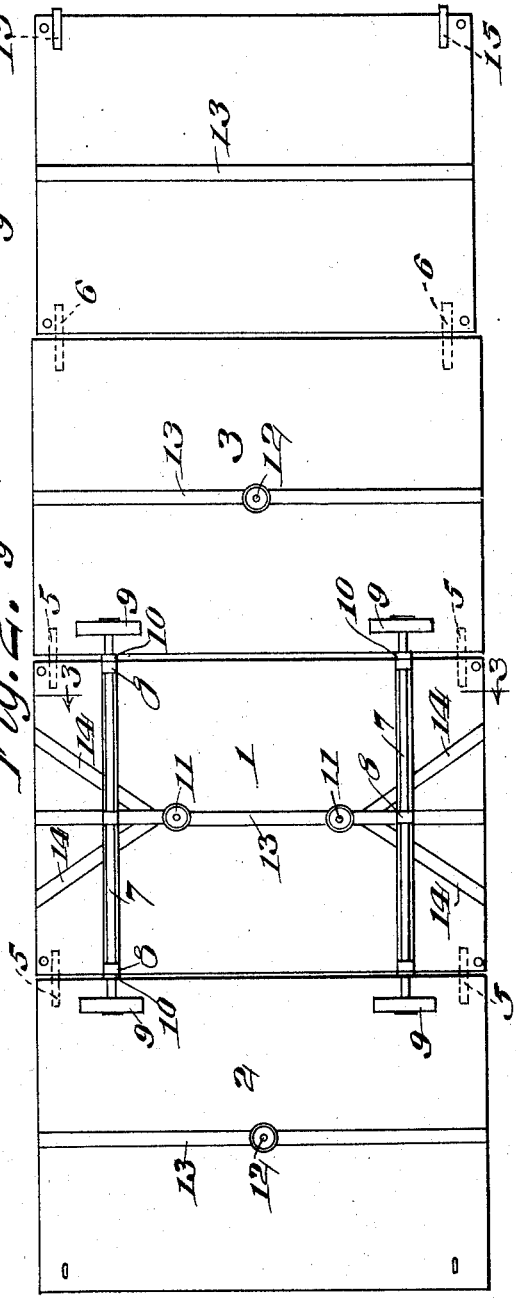
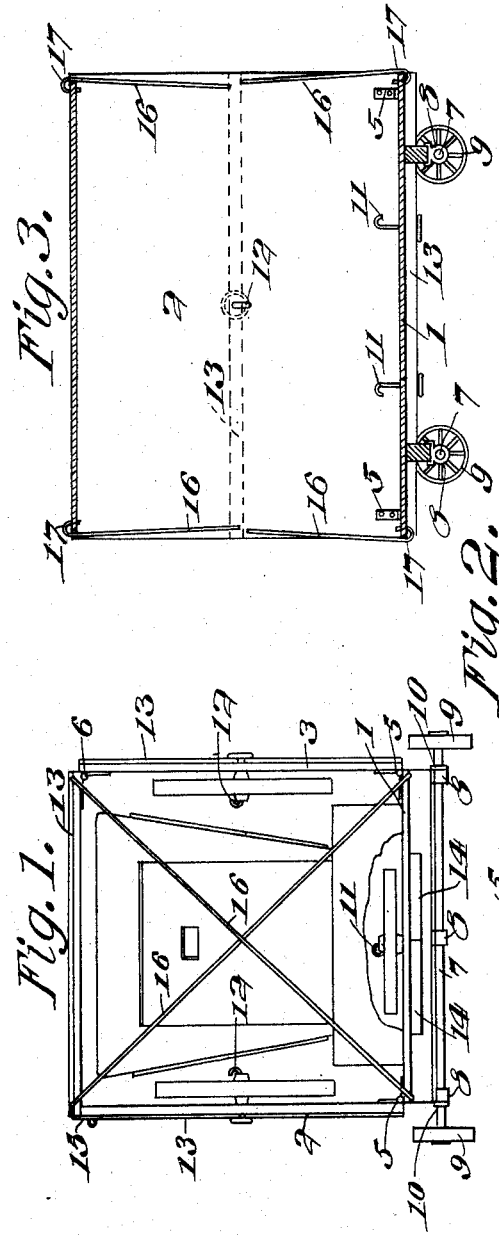
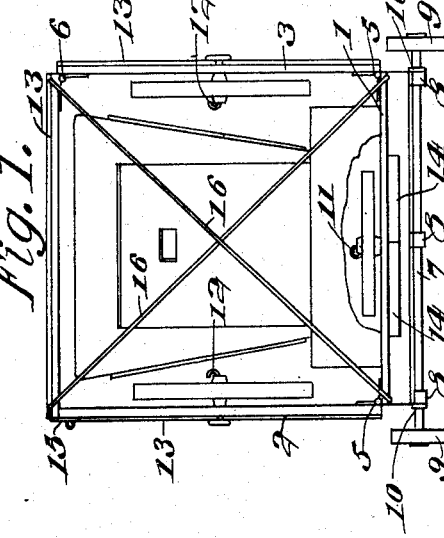
Witnesses
E. D. B. Brown
C. H. Griesbauer
Inventor
John M. Enyart,
By H. B. Willson & Co.
Attorneys
THE NORRIS PETERS CO., WASHINGTON, D. C.

UNITED STATES PATENT OFFICE.

JOHN M. ENYART, OF ELDON, IOWA.

CRATE.

No. 908,983.  Specification of Letters Patent.  Patented Jan. 5, 1909.

Application filed June 29, 1908. Serial No. 440,939.

*To all whom it may concern:*

Be it known that I, JOHN M. ENYART, a citizen of the United States, residing at Eldon, in the county of Wapello and State of Iowa, have invented certain new and useful Improvements in Crates; and I do declare the following to be a full, clear, and exact description of the invention, such as will enable others skilled in the art to which it appertains to make and use the same.

My invention relates to crates, and particularly to that type of device which is used for crating vehicles.

The object of the invention is to provide a device of this character which may be easily set up around a vehicle, and which may be conveniently and expeditiously moved from place to place by a single man.

A further object of the invention is the provision of a device of this character which will be economical to manufacture and thoroughly efficient in construction and operation.

With these and other objects in view, the invention consists of certain novel features of construction, combination and arrangement of parts, as will be more fully described and particularly pointed out in the appended claims.

In the accompanying drawings, Figure 1 is an end elevation of the device set up, Fig. 2 is a bottom plan view of the parts unfolded and Fig. 3 is a vertical section.

Referring more especially to the drawings, 1 represents the bottom of the device, 2 and 3 the sides, 4 the top piece. The sides 2 and 3 are hinged to the bottom as shown, by hinges 5, and the top is hinged to the side by hinges 6. At each end of the bottom I secure a transverse shaft 7, by means of clip bolts 8, and mount upon the ends of the shaft the small wheels or rollers 9. These shafts are held in end bearings 10 at each side of the bottom piece 1. Arranged at intermediate points along the center of the bottom 1 are two bolts 11, by which the front wheels of the vehicle may be secured to the bottom of the device as by passing a bolt through the hub and securing it thereto in a manner shown in Fig. 1. Similar bolts 12 are secured through the side members 2 and 3 so as to secure the rear wheels of the vehicle in position thereupon. Extending across the members 1, 2, 3 and 4 are suitable braces 13. On the bottom piece 1, the brace 13 is reinforced by the diagonal braces 14.

In the application of the device the vehicle is placed upon the platform or base member 1 and secured thereto in any suitable manner. The wheels are then secured to the base plate 1 by the bolts 11 and to the side pieces 2 and 3 by the bolts 12. The side 2 is then raised to vertical position, and the side 3 also raised with its accompanying top which folds over and lies above the bottom 1, and is secured to the sides 2 by suitable latching devices 15.

In order to brace the structure I provide suitable rods 16 which are provided with hooked ends adapted to be engaged by the loops or eyes 17, attached to the top 4 and the bottom piece 1.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. A vehicle crate comprising a bottom member, side members hinged to said bottom member, a top member hinged to one of said members and having means latching into engagement with the other side member, wheeled axles secured upon the bottom member, and brace rods extending from the bottom member to the top member.

2. A vehicle crate comprising a bottom member, side members hinged to said bottom member, a top member hinged to one of said side members and having means latching into engagement with the other side member, wheeled axles secured upon the bottom member, removable brace rods secured to the top and bottom members, and bolts loosely journaled in said side and bottom members adapted to secure the wheels of a vehicle thereto.

In testimony whereof I have hereunto set my hand in presence of two subscribing witnesses.

JOHN M. ENYART.

Witnesses:
J. S. BARLEY,
C. W. FINNEY.